US011940764B2

(12) United States Patent
Son et al.

(10) Patent No.: US 11,940,764 B2
(45) Date of Patent: Mar. 26, 2024

(54) ELECTRONIC DEVICE COMPRISING SPEAKER STRUCTURE

(71) Applicant: Samsung Electronics Co., Ltd., Gyeonggi-do (KR)

(72) Inventors: Kwonho Son, Gyeonggi-do (KR); Sangyoup Seok, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 746 days.

(21) Appl. No.: 17/054,199

(22) PCT Filed: Apr. 8, 2019

(86) PCT No.: PCT/KR2019/004150
§ 371 (c)(1),
(2) Date: Nov. 10, 2020

(87) PCT Pub. No.: WO2020/017738
PCT Pub. Date: Jan. 23, 2020

(65) Prior Publication Data

US 2021/0088979 A1 Mar. 25, 2021

(30) Foreign Application Priority Data

Jul. 19, 2018 (KR) ........................ 10-2018-0084165

(51) Int. Cl.

| | |
|---|---|
| ***G04G 17/08*** | (2006.01) |
| ***G04G 17/02*** | (2006.01) |
| ***H04R 1/02*** | (2006.01) |

(52) U.S. Cl.
CPC ............. *G04G 17/08* (2013.01); *G04G 17/02* (2013.01); *H04R 1/025* (2013.01); *H04R 1/026* (2013.01); *H04R 1/028* (2013.01)

(58) Field of Classification Search
CPC ........ G04G 17/08; G04G 17/02; G04G 21/06; H04R 1/025; H04R 1/026; H04R 1/028
See application file for complete search history.

(56) References Cited

U.S. PATENT DOCUMENTS 5,414,229 A * 5/1995 Rocheleau ............. H04R 1/025 181/150
2006/0033635 A1 * 2/2006 Chen .................. B60R 25/1001 340/541

(Continued)

FOREIGN PATENT DOCUMENTS

CN 107340705 A 11/2017
JP 2007-201669 A 8/2007

(Continued)

OTHER PUBLICATIONS

Examination Report dated Jul. 20, 2022.

*Primary Examiner* — Edwin A. Leon
*Assistant Examiner* — Sean R Brannon
(74) *Attorney, Agent, or Firm* — Cha & Reiter, LLC

(57) ABSTRACT

An electronic device according to various embodiments of the present invention may comprise: a housing comprising a first plate comprising an inner surface defining a part of a space inside the housing and an outer surface forming a part of the exterior of the housing, and a side member formed integrally with the edge of the inner surface and formed substantially perpendicular to the inner surface so as to form a recess together with the inner surface, the side member comprising an opening; a speaker structure arranged adjacent to the opening inside the recess, the speaker structure comprising a first surface comprising a speaker vibration plate facing the opening, and a second surface facing away from the first surface; an engaging member mounted substantially perpendicularly to the inner surface so as to fix the speaker structure to the housing; and a fixing member fixed (Continued)

to the housing so as to contact at least a part of the second surface and arranged so as to pressurize the second surface. The electronic device described above may be varied according to embodiments.

15 Claims, 11 Drawing Sheets

(56) References Cited

U.S. PATENT DOCUMENTS

2009/0168321 A1* 7/2009 Kataoka ............... H05K 9/0054 361/679.22
2011/0261989 A1* 10/2011 Xiao ...................... H04R 1/025 381/387
2012/0219173 A1* 8/2012 Yukawa ................. H04R 1/025 381/388
2013/0221812 A1* 8/2013 Hashimoto ........... G06F 1/1601 312/7.2
2014/0353178 A1 12/2014 Kim
2015/0241916 A1* 8/2015 Choi ..................... A61B 5/1118 361/679.03
2015/0298490 A1* 10/2015 Takechi .................. B43L 1/006 361/679.01
2015/0365119 A1 12/2015 Shin et al.
2016/0212526 A1 7/2016 Salvatti et al.
2016/0223992 A1 8/2016 Seo et al.
2017/0051769 A1 2/2017 Hilario et al.
2018/0063981 A1* 3/2018 Park ...................... H04R 1/023

FOREIGN PATENT DOCUMENTS

KR 20-0119718 Y1 7/1998
KR 10-0184134 B1 5/1999
KR 10-2009-0036497 A 4/2009
KR 10-2012-0061675 A 6/2012
KR 10-2015-0025206 A 3/2015
KR 10-2015-0112468 A 10/2015
KR 10-2016-0093475 A 8/2016

* cited by examiner

ELECTRONIC DEVICE COMPRISING SPEAKER STRUCTURE

CROSS-REFERENCE TO RELATED APPLICATION(S)

This application is a National Phase Entry of PCT International Application No. PCT/KR2019/004150, which was filed on Apr. 8, 2019 and claims priority to Korean Patent Application No. 10-2018-0084165, which was filed on Jul. 19, 2018 in the Korean Intellectual Property Office, the contents of which are incorporated herein by reference.

BACKGROUND

1. Field

Various embodiments relate to an electronic device, and more particularly, to an electronic device including a speaker structure.

2. Description of the Related Art

Typically, an electronic device may mean a device that performs a specific function according to a program provided therein (e.g., an electronic scheduler, a portable multimedia reproducer, a mobile communication terminal, a tablet PC, an image/sound device, a desktop/laptop PC, or a vehicle navigation system) as well as a home appliance. As the degree of integration of electronic devices has increased and super-high-speed and large-capacity wireless communication has become popular, various functions have recently come to be provided in a single electronic device, such as a mobile communication terminal. For example, various functions, such as an entertainment function (e.g., a game function), a multimedia function (e.g., a music/video reproducing function), a communication and security function for mobile banking, a schedule management function, and an e-wallet function, in addition to a communication function, have come to be integrated in a single electronic device.

Recently, body-worn electronic devices have been commercialized, and mobile communication terminals, body-worn electronic devices, or the like are in everyday use. The use environment of an electronic device may vary according to the living space or movement of an individual user, and thus the electronic device may be exposed to a risk of contamination, damage, or the like. For example, the inside of the electronic device may be contaminated by foreign matter or moisture, and a manufacturer or a user may come up with a measure to protect the electronic device from such contamination or damage. For example, a manufacturer may improve the reliability of an electronic device by incorporating a dustproof and waterproof structure in the electronic device, or a user may purchase and use an aftermarket product (e.g., a protective film or a dustproof and waterproof case). As the use of electronic devices is becoming more common and dustproof and waterproof structures are being incorporated therein, the number of users who enjoy leisure activities while carrying or wearing electronic devices is gradually increasing, and the demand for the performance of dustproof and waterproof structures is also gradually increasing.

SUMMARY

In securing a dustproof and waterproof structure in an electronic device, a waterproof member may be disposed between components to block foreign matter or moisture from entering from the outside. However, a microphone hole or a speaker hole providing a sound input/output path may be exposed or opened to the outside, and the sound input/output path may partially allow the inflow of moisture or the like. When moisture that has flowed into the sound input/output path remains there, it may become an obstacle to sound input/output, and may cause corrosion in the internal space of the electronic device.

Various embodiments of the disclosure are able to provide an electronic device including a speaker structure capable of suppressing inflow of moisture through a sound input/output path or the like.

Various embodiments of the disclosure are able to provide an electronic device including a speaker structure capable of rapidly discharging moisture remaining in a sound input/output path.

According to various embodiments of the disclosure, an electronic device may include: a housing including a first plate including an inner surface defining a portion of a space within the housing and an outer surface forming a portion of an exterior of the housing, and a side member integrally formed with an edge of the inner surface to be substantially perpendicular to the inner surface so as to form a recess with the inner surface, the side member including an opening; a speaker structure disposed in the recess adjacent to the opening, the speaker structure including a first surface including a speaker diaphragm facing the opening and a second surface facing away from the first surface; a fastening member mounted substantially perpendicular to the inner surface so as to fix the speaker structure to the housing; and a fixing member fixed to the housing and disposed to be in contact with at least a portion of the second surface so as to press the second surface.

According to various embodiments, an electronic device may include: a housing including a first plate forming a rear surface of the electronic device, a side member extending from the first plate towards a front surface of the electronic device, and an opening formed to penetrate the side member; a speaker structure mounted, adjacent to the opening, in a recess at least partially defined by the first plate and the side member; and a fixing member configured to support a rear surface of the speaker structure so as to fix the speaker structure to an inner surface of the side member. The fixing member may include a first portion, which comes into contact with a portion of a side surface of the speaker structure, a second portion extending from the first portion and bound to the side member, a third portion extending from the first portion to come into contact with the rear surface of the speaker structure, and a fourth portion extending from the third portion and at least partially supported on an inner surface of the first plate.

In the electronic device according to various embodiments of the disclosure, it is possible to provide a sound output (or input) path by forming an opening penetrating the side member of the housing, but to form a waterproof structure by disposing the speaker structure on the inner surface of the side member adjacent to the opening. In an embodiment, the opening extends along the sound emission direction of the speaker structure. Thus, it is possible to minimize the sound output path arriving at the outside of the housing. For example, by reducing the space in which foreign matter such as moisture may flow or remain and facilitating the discharge of moisture or the like using the sound pressure of the speaker structure, it is possible to suppress or alleviate contamination of the internal space of the electronic device. In another embodiment, the fixing member is able to support the speaker structure so as to keep the same in close contact with the side member, and is able to maintain a stable waterproof structure even at a water pressure of 5 atm or more.

DETAILED DESCRIPTION

Figure 1:
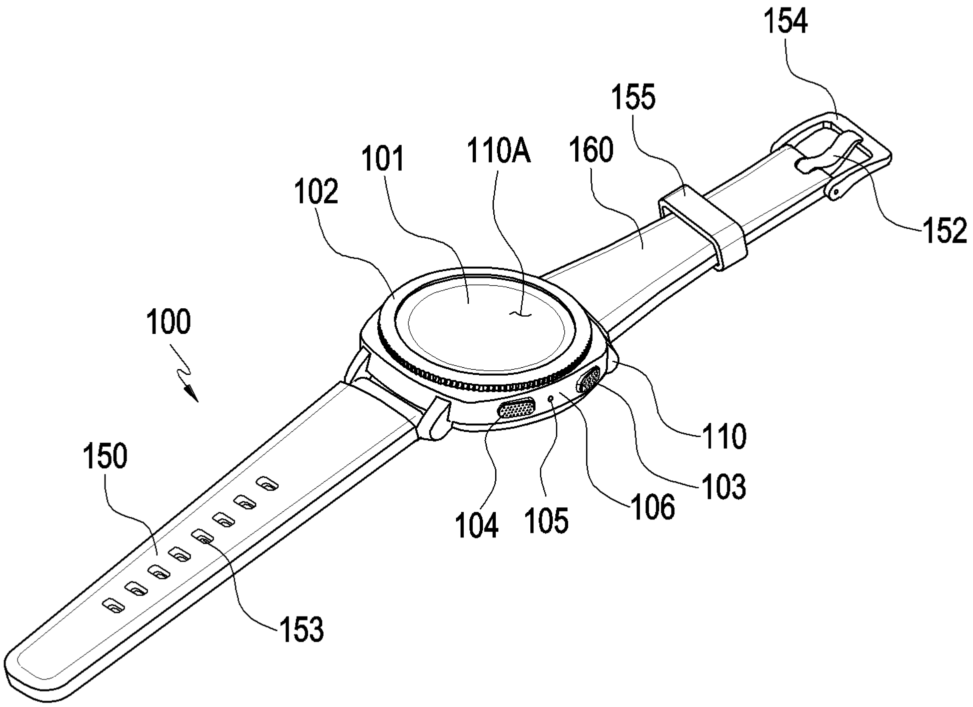
FIG. 1 is a perspective view illustrating an electronic device according to various embodiments of the disclosure.

As the disclosure allows for various changes and numerous embodiments, various example embodiments will be described in greater detail with reference to the accompanying drawings. However, it should be understood that the disclosure is not limited to the specific embodiments, and that the disclosure includes all modifications, equivalents, and alternatives within the spirit and the scope of the disclosure.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Although ordinal terms such as "first" and "second" may be used to describe various elements, these elements are not limited by the terms. The terms are used merely to distinguish an element from the other elements. For example, a first element could be termed a second element, and similarly, a second element could be also termed a first element without departing from the scope of the disclosure. As used herein, the term "and/or" includes any and all combinations of one or more associated items. It is to be understood that if an element (e.g., a first element) is referred to, with or without the term "operatively" or "communicatively", as "coupled with," or "connected with,", the element may be coupled with the other element directly (e.g., wiredly), wirelessly, or via a third element.

Further, the relative terms "a front surface", "a rear surface", "a top surface", "a bottom surface", and the like which are described with respect to the orientation in the drawings may be replaced by ordinal numbers such as first and second. In the ordinal numbers such as first and second, their order are determined in the mentioned order or arbitrarily.

In the disclosure, the terms are used to describe specific embodiments, and are not intended to limit the disclosure. As used herein, the singular forms are intended to include the plural forms as well, unless the context clearly indicates otherwise. In the disclosure, the terms such as "include" and/or "have" may be understood to denote a certain characteristic, number, step, operation, constituent element, component or a combination thereof, but may not be construed to exclude the existence of or a possibility of addition of one or more other characteristics, numbers, steps, operations, elements, components or combinations thereof.

Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the disclosure.

In the disclosure, an electronic device may be a random device, and the electronic device may be called a terminal, a portable terminal, a mobile terminal, a communication terminal, a portable communication terminal, a portable mobile terminal, a touch screen or the like.

For example, the electronic device may, for example, and without limitation, be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function and a pocket size. Further, the electronic device may be a flexible device or a flexible display device. However, the disclosure is not limited thereto.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

Figure 2:
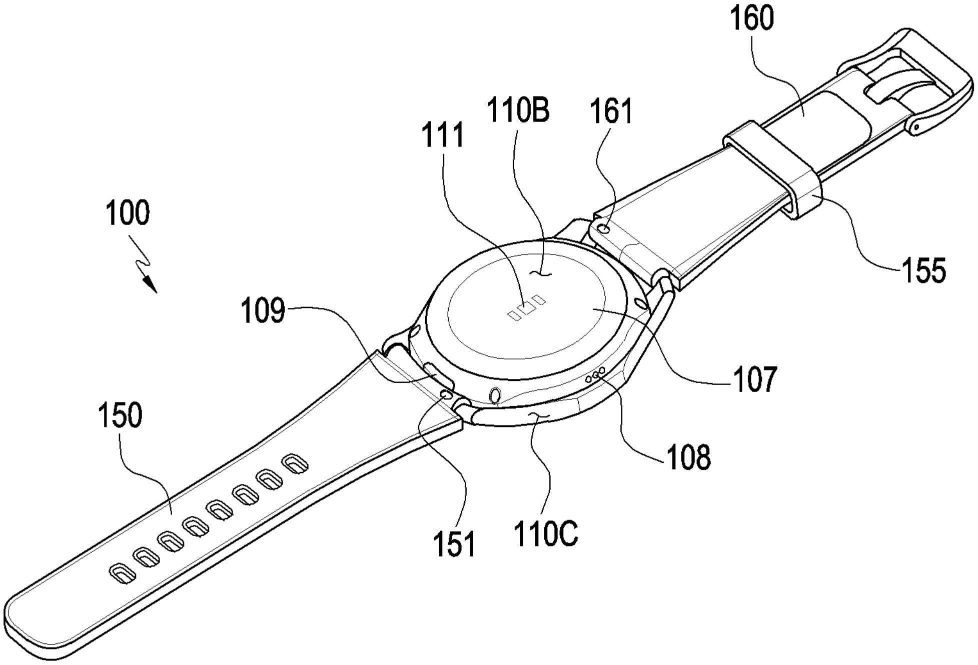
FIG. 2 is a perspective view illustrating the rear surface of the electronic device according to various embodiments of the disclosure.

FIG. 1 is a perspective illustrating an electronic device 100 according to various embodiments of the disclosure. FIG. 2 is a perspective illustrating the rear surface of the electronic device 100 according to various embodiments of the disclosure.

Referring to FIGS. 1 and 2, the electronic device 100 according to an embodiment may include: a housing 100 including a first surface (or a front surface) 110A, a second surface (or a rear surface) 110B, and a side surface 110C surrounding the space between the first surface 110A and the second surface 110B; and binding members 150 and 160 each connected to at least a portion of the housing 110 and configured to removably bind the electronic device 100 on a portion of a body of a user (e.g., a wrist or an ankle). In another embodiment (not illustrated), the term "housing" may mean a structure forming some of the first surface 110A, the second surface 110B, and the side surface 110C of FIG. 1. According to an embodiment, at least a portion of the first surface 110A may be formed by a substantially transparent front plate 101 (e.g., a glass plate or a polymer plate including various coating layers). The second surface 110B may be formed by a substantially opaque rear plate 107. The rear plate 107 may be formed of, for example, coated or colored glass, ceramic, a polymer, a metal (e.g., aluminum, stainless steel (STS), or magnesium), or a combination of two or more of these materials. The side surface 110C may be formed by a side bezel structure 106 coupled to the front plate 101 and the rear plate 107 and including a metal and/or a polymer. In some embodiments, the rear plate 107 and the side bezel structure 106 may be integrally formed, and may include the same material (e.g., a metal material such as aluminum). The binding members 150 and 160 may be formed of various materials and in various shapes. A plurality of integrated-type unit links may be formed to be movable with respect to each other using a woven material, leather, rubber, urethane, metal, ceramic, or a combination of at least two of these materials.

According to an embodiment, the electronic device 100 may include at least one of a display, audio modules 105 and 108, a sensor module 111, key input devices 102,103, and 104, and a connector hole 109. In some embodiments, in the electronic device 100, at least one of the components (e.g., the key input devices 102, 103, and 104, the connector hole 109, or the sensor module 111) may be omitted, or other components may be additionally included.

The display may be disposed on, for example, the inner surface of the front plate 101, and may be exposed through a substantial portion of the front plate 101. The shape of the display may correspond to the shape of the front plate 101, and may be any of various shapes, such as a circle, an ellipse, and a polygon. The display may be coupled to or disposed adjacent to a touch-sensing circuit, a pressure sensor capable of measuring the intensity (pressure) of a touch, and/or a fingerprint sensor.

The audio modules 105 and 108 may include a microphone hole 105 and a speaker hole 108. The microphone hole 105 may include a microphone disposed therein so as to acquire external sound, and in some embodiments, multiple microphones may be disposed therein so as to detect the direction of sound. The speaker hole 108 may be used for an external speaker and a phone call receiver. In some embodiments, the speaker hole 108 and the microphone hole 105 may be implemented as a single hole, or a speaker may be included without the speaker hole 108 (e.g., a piezo speaker).

The sensor module 111 may generate electrical signals or data values corresponding to the internal operating states or the external environmental states of the electronic device 100. The sensor module 111 may include, for example, a biometric sensor module 111 (e.g., an HRM sensor) disposed on the second surface 110B of the housing 110. The electronic device 100 may further include at least one of sensor modules (not illustrated in the drawings), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The key input devices 102, 103, and 104 may include a wheel key 102 disposed on the first surface 110A of the housing 110 and configured to be rotatable in at least one direction, and/or side key buttons 102 and 103 disposed on the side surface 110C of the housing 110. The wheel key may have a shape corresponding to the shape of the front plate 101. In another embodiment, the electronic device 100 may not include some or all of the above-mentioned key input devices 102, 103, and 104, and a non-included key input device 102, 103, or 104 may be implemented in another form, such as a soft key on the display. The connector hole 109 may accommodate a connector (e.g., a USB connector) configured to transmit/receive power and/or data to/from an external electronic device, and may include another connector hole (not illustrated) capable of accommodating a connector configured to transmit/receive an audio signal to/from an external electronic device. The electronic device 100 may further include, for example, a connector cover (not illustrated), which covers at least a portion of the connector hole 109 and blocks inflow of external foreign matter into the connector hole.

Each of the binding members 150 and 160 may be detachably fastened to at least a portion of the housing 110 using a locking member 151 or 161. Each of the binding members 150 and 160 may include at least one of a first fixing member 152, first fixing-member-fastening holes 153, a band guide member 154, and a band-fixing ring 155.

The first fixing member 152 may be configured to fix the housing 110 and the binding members 150 and 160 to a portion of a body of a user (e.g., a wrist or an ankle). The first fixing-member-fastening holes 153 allow the housing 110 and the binding members 150 and 160 to be fixed to the portion of the body of the user in cooperation with the first fixing member 152. The band guide member 154 is configured to limit the movement range of the first fixing member 152 when the first fixing member 152 is fastened to any of the first fixing-member-fastening holes 153 so as to ensure that the binding members 150 and 160 are brought into close contact with and bound on the portion of the body of the user. The band-fixing ring 155 is capable of limiting the movement range of the binding members 150 and 160 in the state in which the first fixing member 152 and any of the first fixing-member-fastening holes 153 are fastened to each other.

Figure 3:
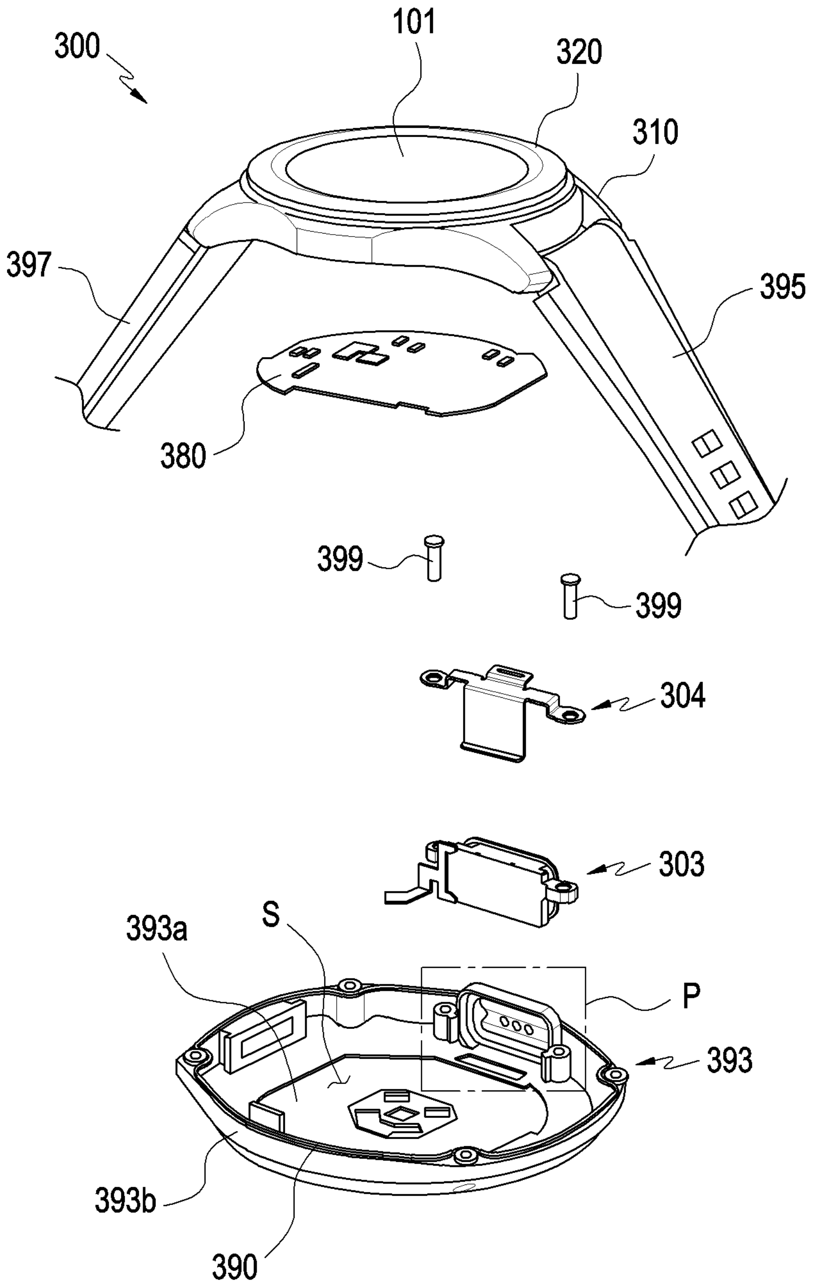
FIG. 3 is an exploded perspective view illustrating an electronic device according to various embodiments of the disclosure.

FIG. 3 is an exploded perspective view illustrating an electronic device 300 (e.g., the electronic device 100 in FIG. 1) according to various embodiments of the disclosure.

Referring to FIG. 3, the electronic device 300 may include a side bezel structure 310 (e.g., the side surface 110C in FIG. 2), a wheel key 320 (e.g., the wheel key 102 in FIG. 1), a front plate 101, a speaker structure 303, a second fixing member 304, a printed circuit board 380, a sealing member 390, a housing 393, and binding members 395 and 397. Although not illustrated, the electronic device 300 may include a display accommodated in a recess S in the housing 393, at least one antenna, a support member (e.g., a bracket), a battery, or the like.

At least one of the components of the electronic device 300 may be the same as or similar to at least one of the components of the electronic device 100 of FIG. 1 or FIG. 2. In the following detailed description, for components that are the same as or similar to those of the preceding embodiment, the same reference numerals in the drawings may be assigned thereto or may be omitted, and overlapping descriptions may be omitted even if reference numerals in the drawings are assigned.

The side bezel structure 310 may form a portion of the exterior of the electronic device 300, and may be connected to or integrally formed with a support member disposed inside the electronic device 300. The support member may be formed of, for example, a metal material and/or a non-metal (e.g., a polymer) material, and may support a display or a printed circuit board 380. On the printed circuit board 380, a processor, a memory, and/or an interface may be mounted. The processor may include, for example, one or more of a central processing unit, an application processor, a graphics processing unit (GPU), an application processor, a sensor processor, or a communication processor.

The memory may include, for example, a volatile memory or a nonvolatile memory. The interface may include, for example, a high-definition multimedia interface (HDMI), a universal serial bus (USB) interface, an SD card interface, and/or an audio interface. The interface may electrically or physically connect, for example, the electronic device 300 to an external electronic device, and may include a USB connector, an SD card/MMC connector, or an audio connector.

The electronic device 300 includes a battery so as to be capable of supplying power to at least one component thereof. The battery may include, for example, a non-rechargeable primary battery, a rechargeable secondary battery, or a fuel cell. At least a portion of the battery may be disposed to be substantially flush with, for example, the printed circuit board 380 while being supported by, for example, the support member. The battery may be integrally disposed inside the electronic device 300, or may be detachably disposed on the electronic device 300.

An antenna of the electronic device 300 may be disposed between the front plate 101 and the rear plate (e.g., the first plate 393*a*) of the housing 393. In some embodiments, the electronic device 300 may include a plurality of antennas disposed to face each other with the printed circuit board 380 interposed therebetween, and a near-field communication (NFC) antenna, a wireless charging antenna, and/or a magnetic secure transmission (MST) antenna may be formed. For example, by including an antenna, the electronic device 300 may perform short-range communication with an external device, may wirelessly transmit/receive power required for charging, or may transmit a short-range communication signal or a magnet-based signal including payment data. In another embodiment, an antenna structure may be formed by the side bezel structure 310, a portion of the housing 393 and/or a portion of the support member, or a combination thereof.

The sealing member 390 may be located between the side bezel structure 310 and the housing 393. The sealing member 390 may be configured to block moisture and foreign matter flowing into the space surrounded by the side bezel structure 310 and the housing 393 from the outside.

The housing 393 may include a first plate 393*a* and a side member 393*b*, and may form another portion of the exterior of the electronic device 300. In an embodiment, the side member 393*b* is integrally formed at the edge of the first plate 393*a*, and may define at least a portion of the recess S in the housing 393 together with the first plate 393*a*. For example, the recess S in the housing 393 may be partially surrounded by the first plate 393*a* and the side member 393*b*. In another embodiment, the side surface of the electronic device 300 may be substantially formed by coupling the side bezel structure 310 to the side member 393*b*. The speaker structure 303 may be disposed to face the inner surface of the side member 393*b*, and may be supported or fixed by the second fixing member 304. In another embodiment, the electronic device 300 may include fastening members 399 so as to fix the speaker structure 303 or the second fixing member 304 to the housing 393 by including fastening members 399.

The configuration or the mounting structure of each of the speaker structure 303 or the second fixing member 304 will be described with further reference to FIGS. 4 to 9.

Figure 4:
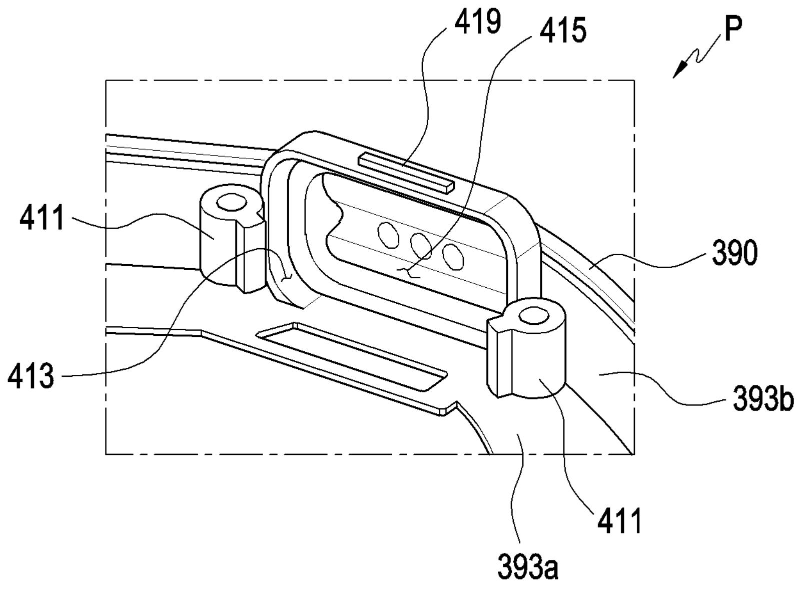
FIG. 4 is an enlarged view illustrating a portion P of FIG. 3 in the housing of the electronic device.
Figure 5A:
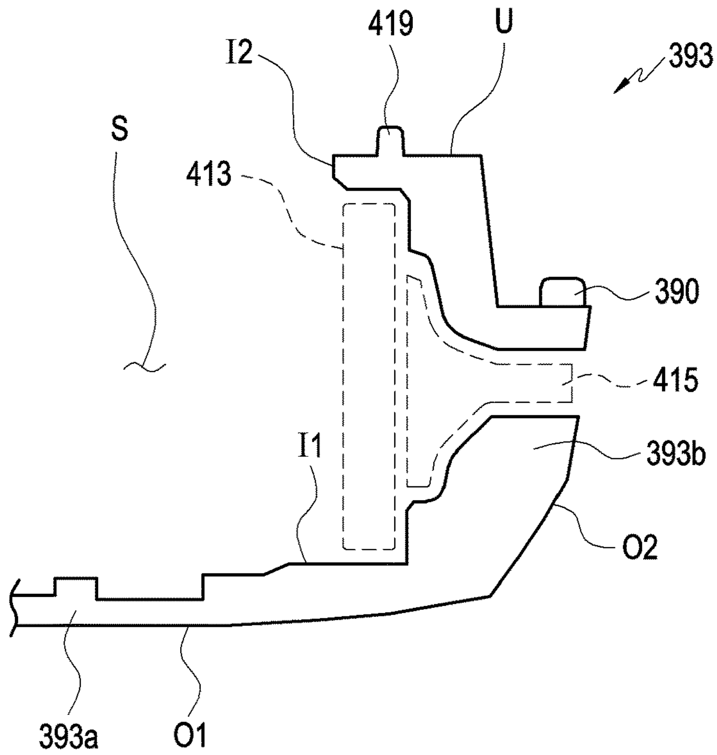
FIGS. 5A and 5B are cross-sectional views each illustrating a portion of the housing of an electronic device according to various embodiments of the disclosure.
Figure 5B:
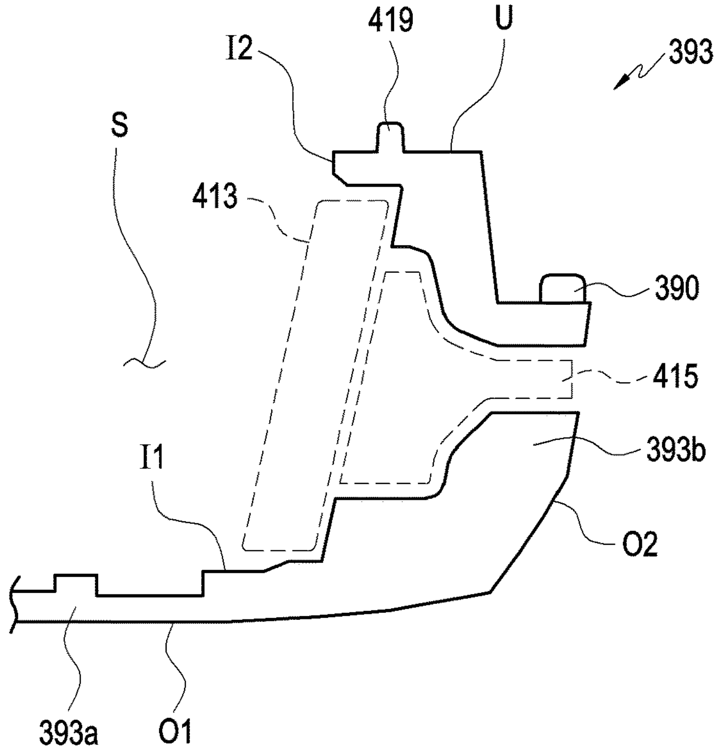

FIG. 4 is an enlarged view illustrating a portion P of FIG. 3 in the housing 393 of the electronic device. FIGS. 5A and 5B are cross-sectional views each illustrating a portion of the housing 393 of the electronic device according to various embodiments of the disclosure.

Further referring to FIGS. 4, 5A, and 5B, the first plate 393*a* may include an outer surface O1 forming a portion of the exterior of the electronic device 300, for example, the rear surface, and an inner surface I1 facing away from the outer surface O1. The side member 393*b* may be formed at an edge of the inner surface I1 of the first plate 393*a* to be inclined or perpendicular to the inner surface I1. For example, an inner surface I2 of the side member 393*b* may be formed to be perpendicular to the inner surface I1, and a portion of the recess S may be defined by the inner surface I1 and the inner side surface I2.

According to various embodiments, the side member 393*b* may include an opening 415. For example, the opening 415 may be formed to penetrate the side member 393*b* from the inner surface I2 to the outer surface O2 of the side member 393*b*, and may provide a sound input or output path. In the present embodiment, by being disposed adjacent to the speaker structure 303, the opening 415 will be described as an example of providing a sound output path, but the disclosure is not limited thereto. If a microphone structure is disposed adjacent to the opening 415, the opening 415 may provide a sound input path. In an embodiment, the opening 415 may have a shape in which a cross-sectional area decreases from the inner surface I2 towards the outer surface O2 along the sound output direction.

According to various embodiments, the side member 393*b* may further include an assembly hole 413 formed in the inner surface I2. The assembly hole 413 has a shape recessed from the inner surface I2 in the sound output direction, and the inner wall of the assembly hole 413 may be substantially a portion of the inner surface I2. In an embodiment, the speaker structure 303 is at least partially accommodated in the assembly hole 413 so as to output sound to the outside of the housing 393 or the electronic device 300 through the opening 415. For example, the opening 415 is connected to the assembly hole 413, and the speaker structure 303 may be mounted in the assembly hole 413 to be connected to an external space (e.g., the housing 393 or the outside of the electronic device 300) through the opening 415.

According to various embodiments, the housing 393 may further include at least one first fastening boss 411. The first fastening boss 411 may protrude from the inner surface of the first plate 393*a*, for example, the inner surface I1, and may extend parallel to the side member 393*b*. In an embodiment, a pair of first fastening bosses 411 may be formed on opposite sides of the assembly hole 415, respectively. As will be described later, the first fastening bosses 411 may provide means for fixing the speaker structure 303 or the second fixing member 304 to the housing 393 when the fastening members 399 are fastened thereto.

According to various embodiments, the housing 393 may further include a binding protrusion 419 and a support groove 421. The binding protrusion 419 may protrude from the top surface U of the side member 393*b* inclined or perpendicular to the inner surface I2. The support groove 421 is formed as a portion of the first plate 393*a*, for example, the inner surface I1, is recessed at a position adjacent to the side member 393*b* or the assembly hole 413. The binding protrusion 419 or the support groove 421 may provide means for binding or supporting at least a portion of the second fixing member 304.

Figure 6:
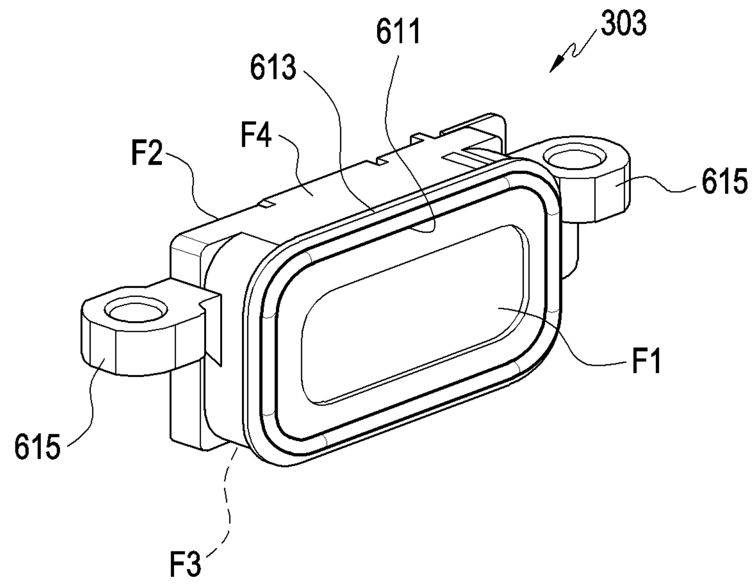
FIG. 6 is a perspective view illustrating a speaker structure of an electronic device according to various embodiments of the disclosure.

FIG. 6 is a perspective view illustrating a speaker structure (e.g., the speaker structure 303 in FIG. 3) of an electronic device according to various embodiments of the disclosure.

Referring to FIG. 6, the speaker structure 303 may include a first surface (e.g., the front surface) F1, a second surface (e.g., the rear surface) F2 facing away from the first surface F1, and an outer surface at least partially surrounding the space between the first surface F1 and the second surface F2 and being substantially perpendicular to the first surface F1 or the second surface F2. For the sake of brevity of description, a portion of the outer surface will be referred to as a "third surface F3" and another portion of the outer surface will be referred to as a "fourth surface F4". When the speaker structure 303 is mounted in the housing 393, the third surface F3 may be disposed to face the inner surface I1, and the fourth surface F4 may be disposed to face away from the third surface F3. For example, the fourth surface F4 may be disposed adjacent to the top surface U of the side member 393*b*. In an embodiment, the first surface F1 may include a diaphragm, and may substantially form a sound output surface of the speaker structure 303.

According to various embodiments, the speaker structure 303 may include a waterproof member (e.g., the waterproof member 1106 in FIGS. 11A and 11B), for example, a first waterproof protrusion 611 and a second waterproof protrusion 613. The waterproof member described above may be disposed at the edge of the first surface F1 or adjacent to the edge of the first surface F1, and may be in close contact with the side member 393*b*. For example, the waterproof member may form a sealing structure (e.g., a waterproof structure) between the first surface F1 and the side member 393*b*. In an embodiment, the first waterproof protrusion 611 may protrude from the edge of the first surface F1, and may form a closed curve along the edge of the first surface F1. For example, when the speaker structure 303 is mounted in the housing 393, the first waterproof protrusion 611 is disposed in the form of protruding from the first surface F1 in the direction in which the opening 415 extends or in the direction in which the speaker structure 303 outputs sound, and may be in close contact with the inner surface I2 of the side member 393*b* (e.g., the inner wall of the assembly hole 413) around the opening 415. In another embodiment, the second waterproof protrusion 613 may be disposed adjacent to the first waterproof protrusion 611 on the outer surface of the speaker structure 303. For example, the second waterproof protrusion 613 may protrude from the outer surface of the speaker structure 303, and may form a closed curve along the circumference of the speaker structure 303.

According to various embodiments, waterproof members, for example, the first waterproof protrusion 611 and the second waterproof protrusion 613, may be disposed inside the assembly hole 413, and may form a sealing structure between the speaker structure 303 and the side member 393*b*. For example, a waterproof structure is formed between the speaker structure 303 and the side member 393*b*, and the opening 415 may be isolated from the recess S by the speaker structure 303 and the waterproof member. The arrangement structure of the waterproof member described above will be described in more detail with reference to FIGS. 11A and 11B.

According to various embodiments, the speaker structure 303 may further include second fastening bosses 615 corresponding to the first fastening bosses 411. In an embodiment, a pair of second fastening bosses 615 may be disposed on opposite sides of the speaker structure 303, respectively. When the speaker structure 303 is mounted in the housing 393, for example, when the first waterproof protrusion 611 or the second waterproof protrusion 613 is accommodated in the assembly hole 413, the second fastening bosses 615 may be seated on the upper end of the first fastening bosses 411.

Figure 7:
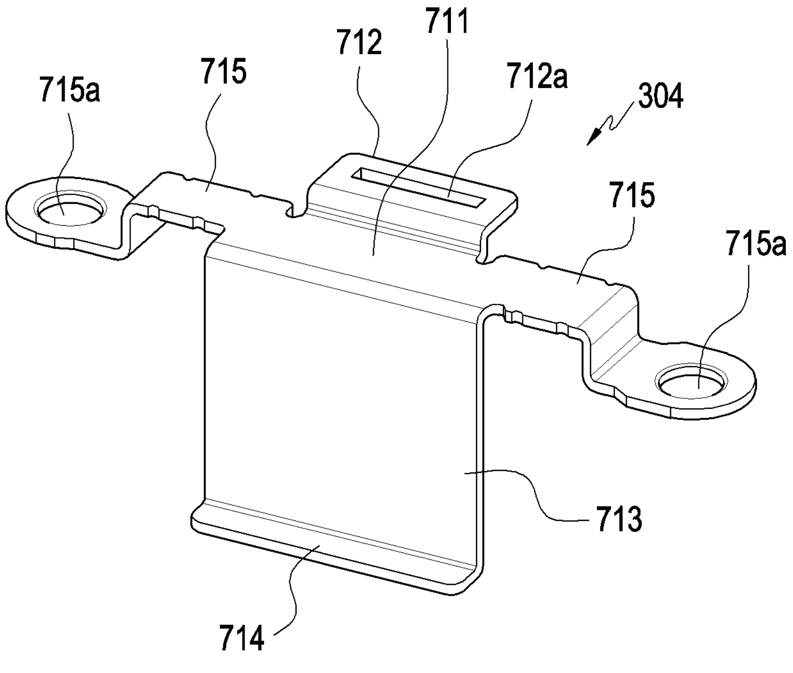
FIG. 7 is a perspective view illustrating a second fixing member of an electronic device according to various embodiments of the disclosure.

FIG. 7 is a perspective view illustrating a second fixing member (e.g., the second fixing member 304 in FIG. 3) of an electronic device according to various embodiments of the disclosure.

Referring to FIG. 7, the second fixing member 304 is formed by processing a plate material including a metal, and may be fixed to the housing 393 so as to come into contact with the rear surface of the speaker structure 303, for example, the second surface F2. For example, the second fixing member 304 may have a shape that at least partially surrounds the speaker structure 303 by cutting or bending a plate material into a designed shape. According to an embodiment, the second fixing member 304 may bring the speaker structure 303 into close contact with the inner surface I2 of the side member 393*b* (e.g., the inner wall of the assembly hole 413) by pressing the second surface F2 of the speaker structure 303.

According to various embodiments, the second fixing member 304 includes a plurality of portions divided according to a bent shape or a region corresponding to another structure (e.g., the housing 393 or the speaker structure 303). For example, the second fixing member 304 may include a first portion 711 that comes into contact with at least a portion of an outer surface of the speaker structure 303, for example, the fourth surface F4, and a second portion 712 extending from a portion of the first portion 711 and coupled to the side member 393*b*. In an embodiment, the portion of the second fixing member 304 that comes into contact with the second surface F2 may be defined as a third portion 713 extending from the first portion 711. In another embodiment, the second fixing member 304 may include a fourth portion 714, which extends from the third portion 713 and comes into contact with the housing 393. In another embodiment, the second fixing member 304 may include fastening pieces 715 extending away from each other on opposite sides of the first portion 711.

According to various embodiments, the first portion 711 may be disposed to be in contact with the fourth surface F4 so that the speaker structure 303 can be fixed between the inner surface (e.g., the inner surface I1 in FIG. 5A) of the first plate 393*a* and the first portion 711. Since the speaker structure 303 is in the state of being partially accommodated in the assembly hole 413, and is constrained between the first portion 711 and the inner surface I1, the speaker structure 303 can be stably fixed. In an embodiment, the second portion 712 may be bent or extend in a stepped state with respect to the first portion 711 and may be substantially parallel to the first portion 711. According to an embodiment, the second portion 712 may form a single substantially flat plate shape, rather than forming a step with respect to the first portion 711. For example, the shapes of the first portion 711 and the second portion 712 may vary depending on the shape or assembly structure of the speaker structure 303 or the side member 393*b*. In another embodiment, the second portion 712 may include a binding protrusion (e.g., a binding hole 712*a* corresponding to the binding protrusion 419 in FIG. 4) of the side member 393*b*. For example, the second portion 712 may at least partially come into contact with the top surface U of the side member 393*b*, and the binding protrusion 419 may be engaged with the binding hole 712*a*.

According to various embodiments, the third portion 713 may extend from the first portion 711, and may be bent to be inclined or substantially perpendicular to the first portion 711. In an embodiment, when the second fixing member 304 is mounted in the housing 393, the third portion 713 may be disposed to face or to be in contact with the second surface F2. For example, when the second fixing member 304 is mounted in the housing 393, the speaker structure 303 may be disposed between the third portion 713 and the inner surface I2 of the side member 393*b* (e.g., the inner wall of the assembly hole 413). In an embodiment, the third portion 713 may bring the waterproof member (e.g., the first waterproof protrusion 611 or the second waterproof protrusion 613 in FIG. 6) into close contact with the inner surface I2 of the side member 393*b* (e.g., the inner wall of the assembly hole 413) by pressing the second surface F2 of the speaker structure 303. In some embodiments, the waterproof member may be made of an elastic body such as silicone or urethane, and may be pressed while being in close contact with the inner surface I2 of the side member 393*b*. If the waterproof member is made of an elastic body, the waterproof member may be integrally formed with the speaker structure 303 through double injection molding or insert injection molding. In some embodiments, the waterproof member may be bonded to the speaker structure 303 using adhesive tape, an adhesive, or the like.

According to various embodiments, the fourth portion 714 extends from the third portion 713, and may be bent to be inclined or perpendicular to the third portion 713. In an embodiment, the fourth portion 714 may be disposed in the state of facing the inner surface (e.g., the inner surface I1 in FIG. 5A) of the first plate 393*a* so as to be supported on the inner surface I1. For example, in the inner surface I1, the support groove 421 may be formed to correspond to the fourth portion 714, and the fourth portion 714 may be accommodated in the support groove 421.

According to various embodiments, a pair of fastening pieces 715 may respectively extend from opposite sides of the first portion 711. Each fastening piece 715 may have a shape that is bent so as to come into contact with the fourth surface F4 at one portion thereof and to come into contact with one of the opposite side surfaces of the speaker structure 303 at another portion thereof. For example, the fastening pieces 715 may be bent in a shape that partially surrounds the outer surface of the speaker structure 303 including a portion of the fourth surface F4. The fastening pieces 715 may include fastening holes 715*a* formed at the ends thereof, respectively, and the fastening holes 715*a* may be substantially aligned with the first fastening bosses 411 or the second fastening bosses 615.

Figure 8:
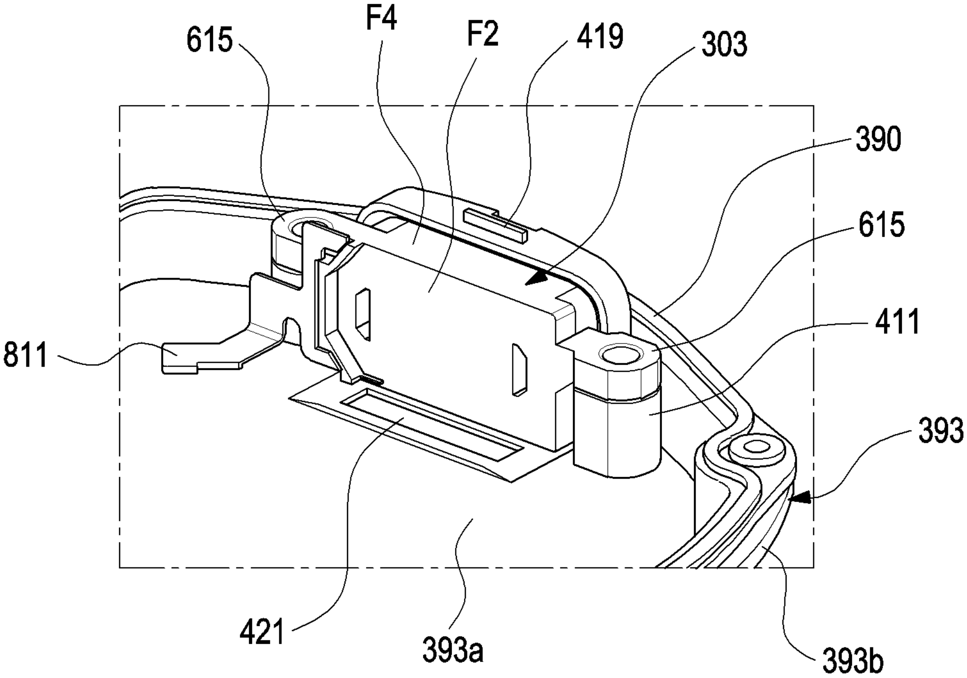
FIG. 8 is a perspective view illustrating the state in which a speaker structure is disposed in the housing of an electronic device according to various embodiments of the disclosure.

FIG. 8 is a perspective view illustrating the state in which a speaker structure (e.g., the speaker structure 303 in FIG. 6) is disposed in the housing in an electronic device according to various embodiments of the disclosure.

Referring to FIG. 8, in the state in which the third surface F3 faces the inner surface (e.g., the inner surface I1 in FIG. 5A), the top surface of the speaker structure 303, for example, the fourth surface F4 side, may enter the assembly hole 413 first, and then the third side F3 side may enter the assembly hole 413. When the speaker structure 303 is partially accommodated in the assembly hole 413, the second fastening bosses 615 may be aligned or seated on the upper ends of the first fastening bosses 411. In an embodiment, a flexible printed circuit board 811 extending from the speaker structure 303 may be partially fixed to the inner surface I1.

Figure 9:
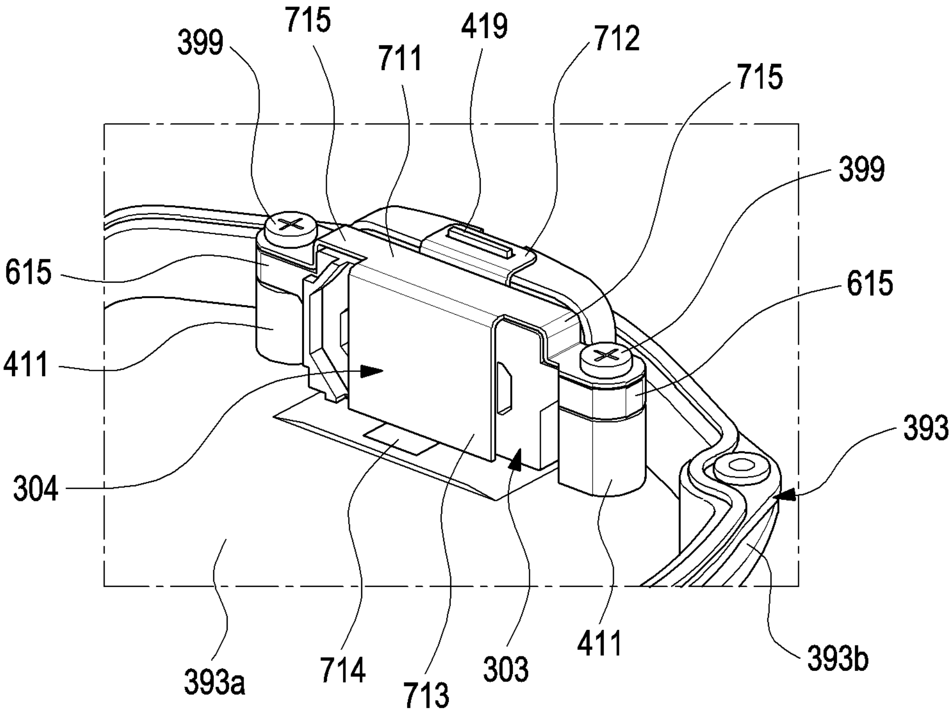
FIG. 9 is a perspective view illustrating the state in which a second fixing member is mounted in the housing of an electronic device according to various embodiments of the disclosure.

FIG. 9 is a perspective view illustrating the state in which a second fixing member (e.g., the second fixing member 304 in FIG. 7) is mounted in the housing in an electronic device according to various embodiments of the disclosure.

Referring to FIG. 9, after the speaker structure 303 is first seated on the housing 393, the second fixing member 304 is coupled so as to fix the speaker structure 303 to the housing 393. According to an embodiment, the second fixing member 304 may be seated on the housing 393 in the state in which the first portion 711 is in contact with the fourth surface F4 and the third portion 713 is in contact with the second surface F2. For example, the second portion 712 may be disposed on the top surface U of the side member 393*b* in the state in which the binding protrusion 419 is engaged with the binding hole 712*a*, and the fourth portion 714 may be accommodated in the support groove (e.g., the support groove 421 in FIG. 4). According to another embodiment, the end of the fourth portion 714 may be supported on the inner wall of the support groove 421. For example, the second portion 712 and the fourth portion 714 may support the third portion 713 so as to press the rear surface of the speaker structure, for example, the second surface F2.

According to various embodiments, in the state in which the second fixing member 304 is seated on the housing 393, the fastening pieces 715, for example, the fastening holes 715*a*, may be disposed on the top surfaces 411 of the first fastening bosses 411, with the second fastening bosses 615 interposed therebetween. According to an embodiment, fastening members (e.g., the fastening members 399 in FIG. 3) may sequentially pass through the fastening holes 715*a* and the second fastening bosses 615 along a direction parallel to the side member 393*b* (e.g., a direction perpendicular to the sound output direction), and may be fastened to the first fastening bosses 411.

According to various embodiments, the second fixing member 304 or the fastening members 399 may substantially fix the speaker structure 303 to the housing 393. For example, the second portion 712, the third portion 713, or the fourth portion 714 may constrain the speaker structure 303 to the housing 393 in the sound output direction of the speaker structure 303 (e.g., the direction A in FIGS. 11A and 11B). In another embodiment, the first portion 711, the fastening pieces 715, or the fastening members 399 may constrain the speaker structure 303 to the housing 393 in a direction perpendicular to the sound output direction A.

Figure 10:
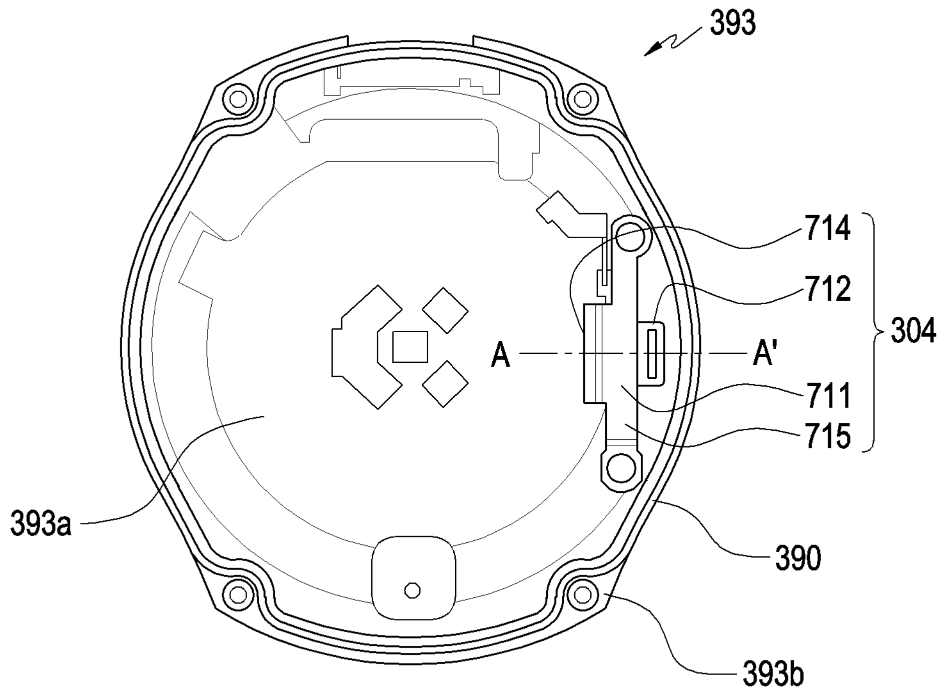
FIG. 10 is a plan view illustrating the state in which a second fixing member is mounted in the housing of an electronic device according to various embodiments of the disclosure.
Figure 11A:
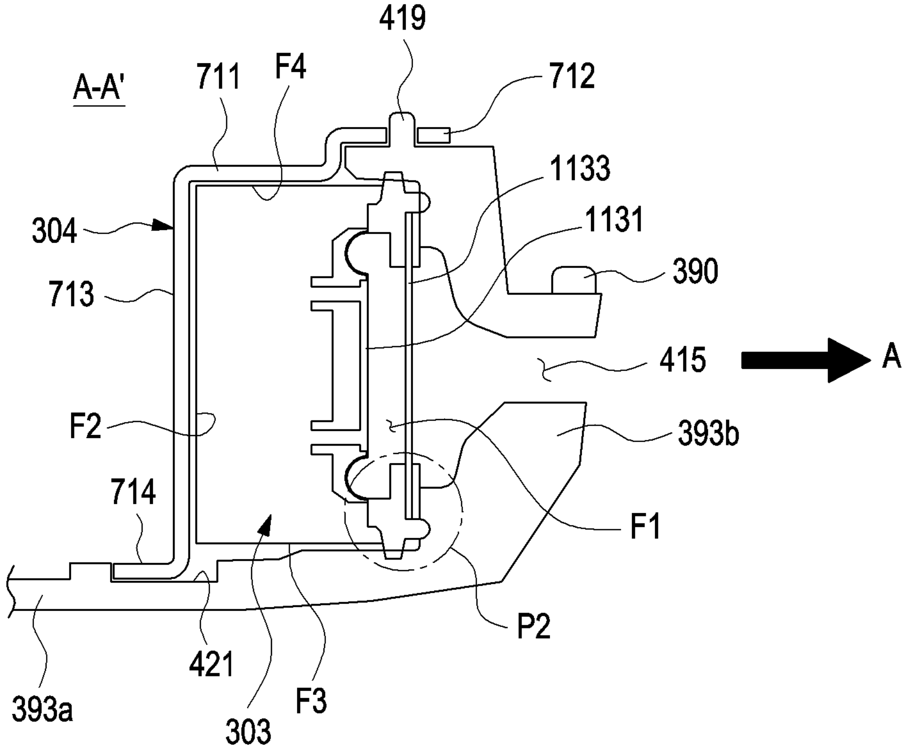
FIGS. 11A and 11B are cross-sectional views of the housing, which are taken along line A-A' in FIG. 10.
Figure 11B:
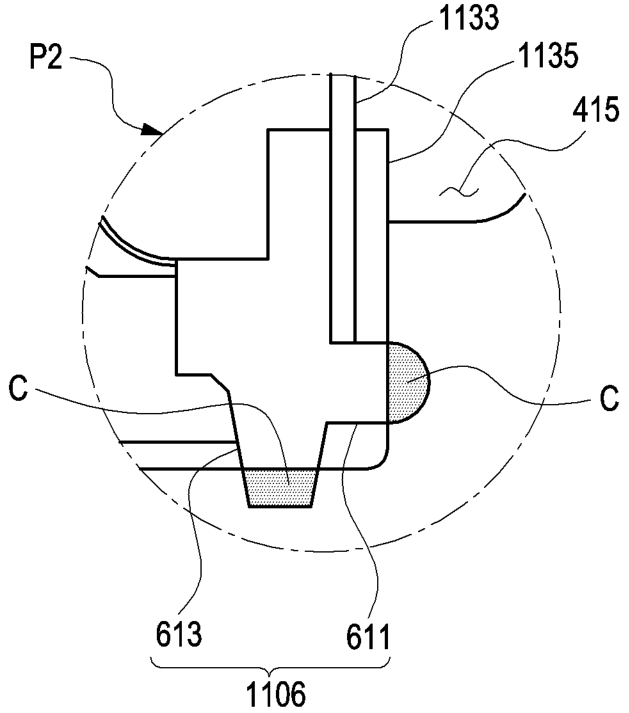
Figure 12:
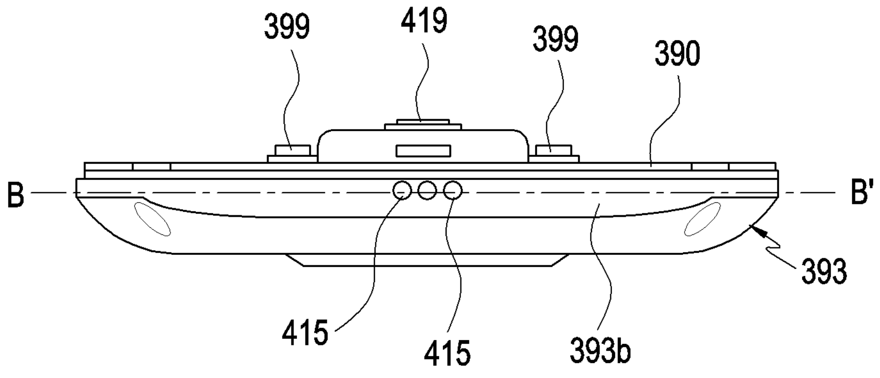
FIG. 12 is a side view illustrating the state in which a second fixing member is mounted in the housing of an electronic device according to various embodiments of the disclosure.
Figure 13:
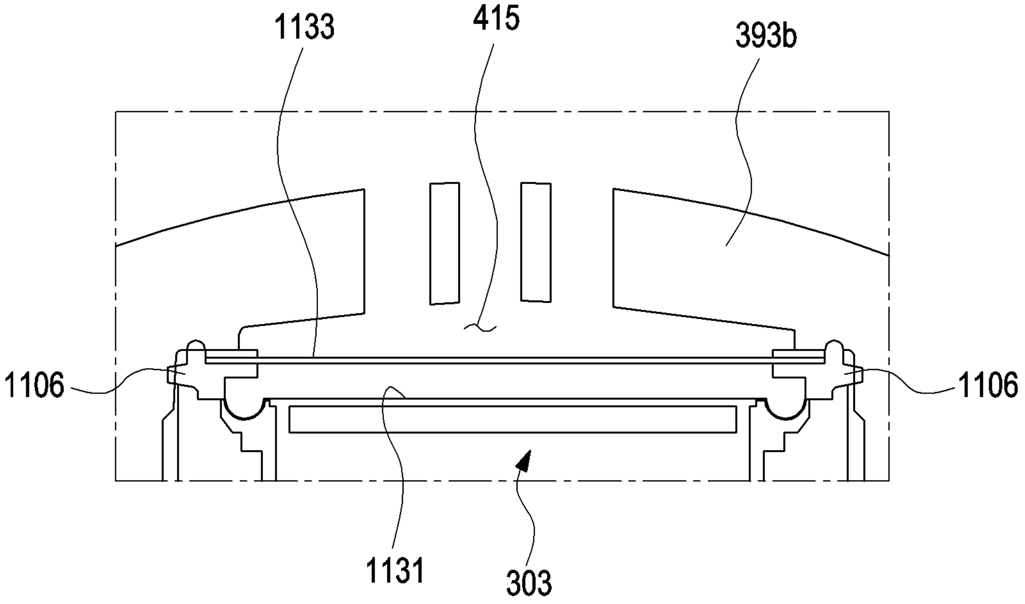
FIG. 13 is a cross-sectional view of the housing, which is taken along line B-B' in FIG. 12.

FIG. 10 is a plan view illustrating the state in which a second fixing member (e.g., the second fixing member 304 in FIG. 7) is mounted in the housing in an electronic device according to various embodiments of the disclosure. FIGS. 11A and 11B are cross-sectional views of the housing, which are taken along line A-A' in FIG. 10. FIG. 12 is a side view illustrating the state in which the second fixing member (e.g., the second fixing member 304 in FIG. 7) is mounted in the housing in the electronic device according to various embodiments of the disclosure. FIG. 13 is a cross-sectional view of the housing, which is taken along line B-B' in FIG. 12.

Referring to FIGS. 10 to 13, in the state in which the speaker structure 303 and the second fixing member 304 are assembled to the housing 393, the speaker structure 303 may be partially accommodated in the assembly hole 413, and may be supported by the third portion 713. The third portion 713 may substantially press the speaker structure 303, and the waterproofing member 1106, for example, the first waterproof protrusion 611 or the second waterproof protrusion 613, may be in close contact with the inner wall of the assembly hole 413. According to an embodiment, in the state of being assembled to the housing 393, the first waterproof protrusion 611 may protrude from the first surface F1, for example, the sound emission surface of the speaker structure 303, towards the outer surface O2 of the side member 393*b* along the sound output direction A. In another embodiment, the second waterproof protrusion 613 may protrude from the third surface F3, the fourth surface F4, or the opposite side surfaces of the speaker structure 303 in a direction perpendicular to the sound output direction A. For example, the first waterproof protrusion 611 and the second waterproof protrusion 613 may be in close contact with the inner wall of the assembly hole 413 at different positions, respectively.

According to various embodiments, in the state in which the first waterproof protrusion 611 or the second waterproof protrusion 613 has already been in close contact with the inner wall of the assembly hole 413, when the third portion 713 presses the speaker structure 303 (e.g., the second surface F2), the first waterproof protrusion 611 or the second waterproof protrusion 613 may be compressed. The shaded area indicated by "C" in the first waterproof protrusion 611 or the second waterproof protrusion 613 in FIGS. 11A and 11B exemplifies a pressed portion. In an embodiment, the outer surface of the first waterproof protrusion 611 or the second waterproof protrusion 613 may at least partially include a curved surface or a flat surface. For example, the first waterproof protrusion 611 may include an outer surface, which is at least partially curved, and may be in close contact with the inner surface I2 of the side member 393*b* (e.g., the inner wall of the assembly hole 413) substantially around the opening 415. When the first waterproof protrusion 611 is pressed while being in close contact with the inner wall of the assembly hole 413, the contact area between the outer surface formed in a curved surface and the inner wall of the assembly hole 413 can be increased. A more stable sealing structure, for example, a waterproof structure, may be formed, for example, between the first waterproof protrusion 611 and the inner wall of the assembly hole 413. In an embodiment, the second waterproof protrusion 613 may include an at least partially planar outer surface. While a portion of the speaker structure 303 is entering the assembly hole 413, the second waterproof protrusion 613 may be gradually pressed while partially rubbing against the inner wall of the assembly hole 413. For example, the second waterproof protrusion 613 may also be in close contact with the inner wall of the assembly hole 413 so as to form a waterproof structure.

According to various embodiments, the diaphragm 1131 of the speaker structure 303 is disposed to face the opening 415, and thus the sound output from the diaphragm 1131 or the speaker structure 303 is emitted substantially through the opening 415 in the sound output direction A. In some embodiments, the diaphragm 1131 may form a portion of the first surface F1, or may be located further inwards than the first surface F1. When the diaphragm 1131 is contaminated by foreign matter such as dust, sound may not be smoothly output. The electronic device (e.g., the electronic device 300 in FIG. 3) may further include a mesh member 1133 mounted in the opening 415 or mounted on the speaker structure 303, thereby blocking the inflow of foreign matter from the outside while outputting or emitting sound through the opening 415.

According to various embodiments, the sound emission surface of the speaker structure 303, for example, the first surface F1, is disposed to substantially face the inner surface I2 of the side member 393*b*, and the opening 415 may extend through the side member 393*b* from the inner surface I2 of the side member 393*b* (e.g., the inner wall of the assembly hole 413 in FIG. 5A) to the outer surface O2 of the side member 393*b*. For example, the length of the opening 415 may be substantially smaller than the thickness of the side member 393*b*, and the space for providing a sound emission path inside the side member 393*b* may be reduced. According to an embodiment, the opening 415 has a cross-sectional area that decreases gradually from the inner surface I2 of the side member 393*b* or the assembly hole 413 towards the outer surface O2 of the side member 393*b*. The shape of the opening described above is able to facilitate discharge of foreign matter or moisture while suppressing the inflow of foreign matter or moisture. For example, since the area of the opening 413 is small in the outer surface O2 of the side member 393*b*, it is possible to suppress the inflow of foreign matter or the like from the outside. Foreign matter that has already flowed into the opening 415 or remains inside the opening 415 can be easily discharged by the sound pressure generated by the operation of the speaker structure 303.

Figure 14:
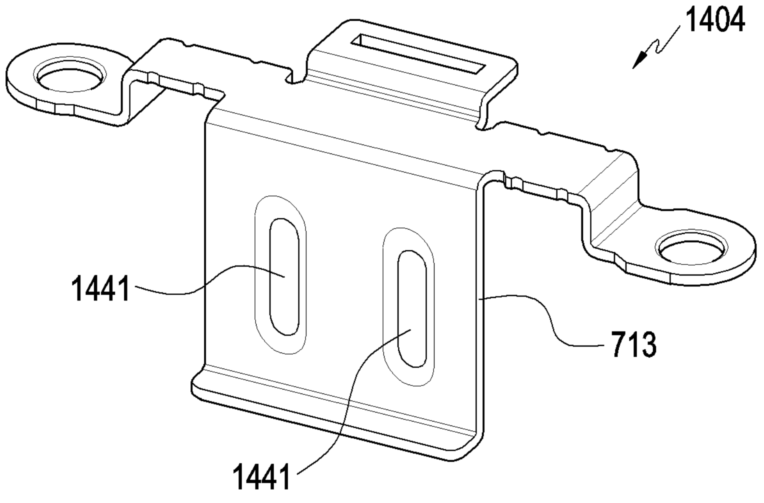
FIGS. 14 and 15 are perspective views illustrating exemplary modified second fixing members of an electronic device according to various embodiments of the disclosure, respectively.
Figure 15:
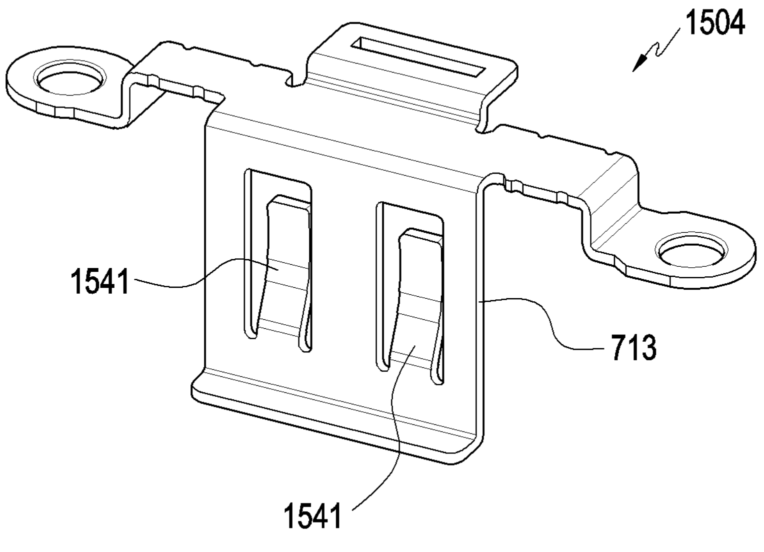

FIGS. 14 and 15 are perspective views illustrating exemplary modified second fixing members 1404 and 1504, respectively, of an electronic device according to various embodiments of the disclosure.

Referring to FIG. 14, the second fixing member 1404 may further include a support, for example, beads 1441 formed on the third portion 713. The beads 1441 may protrude from the third portion 713 to a surface facing the speaker structure (e.g., the speaker structure 303 in FIG. 9). For example, by forming the beads 1441, force for pressing the speaker structure may be increased, and a more stable fixing structure or waterproof structure may be formed. In some embodiments, since the beads 1441 press the speaker structure, various components are able to form a stable waterproof structure even if there are manufacturing errors, which may occur within a design range (e.g., a tolerance), in various components (e.g., the second fixing member 1504 or the speaker structure 303 in FIG. 9).

Referring to FIG. 15, the support formed on the third portion 713 of the second fixing member 1504 may be formed as leaf springs 1541. For example, the leaf springs 1541 may be formed by partially cutting the third portion 713 and bending the cut portions to protrude towards the surface facing the speaker structure. The leaf springs 1541 press the speaker structure so that the speaker structure can be fixed more stably or so that the waterproof performance can be improved.

Figure 16:
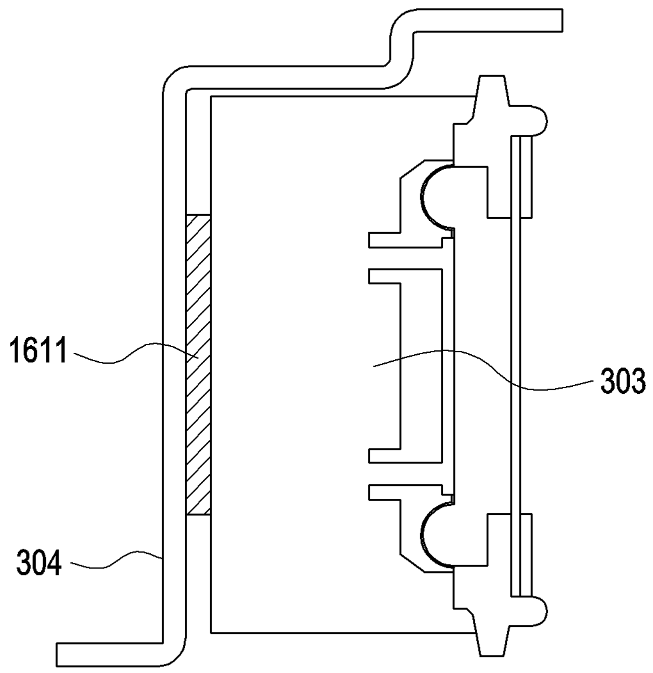
FIG. 16 is a perspective view illustrating a modification of an electronic device according to various embodiments of the disclosure.

FIG. 16 is a perspective view illustrating a modification of an electronic device according to various embodiments of the disclosure.

Referring to FIG. 16, the electronic device (e.g., the electronic device 300 in FIG. 3) may include another type of support 1611. For example, the third portion of the second fixing member 304 may have a substantially flat plate shape in a region facing the speaker structure 303, and the support 1611 may be interposed between the third portion of the second fixing member 304 and the speaker structure 303. In an embodiment, the support 1611 may be made of an elastic body such as sponge or urethane, and a stable fixing structure or a waterproof structure can be formed by pressing the speaker structure 303 together with the second fixing member 304.

As described above, according to various embodiments of the disclosure, an electronic device (e.g., the electronic device 100 or 300 in FIG. 1 or FIG. 3) may include: a housing (e.g., the housing 393 in FIG. 3) including a first plate (e.g., the first plate 393*a* in FIG. 5A) including an inner surface (e.g., the inner surface I1 in FIG. 5A) defining a portion of a space within the housing and an outer surface (e.g., the outer surface O1 in FIG. 5A) forming a portion of an exterior of the housing, and a side member (e.g., the side member 393*b* in FIG. 5A) integrally formed with an edge of the inner surface to be substantially perpendicular to the inner surface so as to form a recess (e.g., the recess S in FIG. 3) with the inner surface, the side member including an opening (e.g., the opening 415 in FIG. 5A); a speaker structure (e.g., the speaker structure 303 in FIG. 3 or FIGS. 11A and 11B) disposed in the recess adjacent to the opening, the speaker structure including a first surface (e.g., the first surface F1 in FIGS. 11A and 11B) including a speaker diaphragm (e.g., the diaphragm 1131 in FIGS. 11A and 11B) facing the opening and a second surface (e.g., the second surface F2 in FIGS. 11A and 11B) facing away from the first surface; a fastening member (e.g., the fastening member 399 in FIG. 3) mounted substantially perpendicular to the inner surface so as to fix the speaker structure to the housing; and a fixing member (e.g., the second fixing member 304 in FIG. 3 or FIGS. 11A and 11B) fixed to the housing and disposed to be in contact with at least a portion of the second surface so as to press the second surface.

According to various embodiments, the speaker structure may further include a third surface (e.g., the third surface F3 in FIGS. 11A and 11B) facing the inner surface while being perpendicular to the first surface and the second surface, and a fourth surface (e.g., the fourth surface F4 in FIGS. 11A and 11B) facing away from the third surface while being perpendicular to the first surface and the second surface, and the fixing member may include a first portion (e.g., the first portion 711 in FIGS. 11A and 11B), which comes in contact with at least a portion of the fourth surface, a second portion (e.g., the second portion 712 in FIGS. 11A and 11B) extending from at least a portion of the first portion and coupled to the side member, a third portion (e.g., the third portion 713 in FIGS. 11A and 11B) that comes into contact with at least a portion of the second surface, and a fourth portion (e.g., the fourth portion 714 in FIGS. 11A and 11B) extending from the third portion to be come into contact with the inner surface while being perpendicular to the third portion.

According to various embodiments, the inner surface may include a support groove (e.g., the support groove 421 in FIGS. 11A and 11B) that accommodates the fourth portion.

According to various embodiments, the fixing member may include a metal.

According to various embodiments, the speaker structure may further include a waterproofing member (e.g., the waterproofing member 1106 in FIGS. 11A and 11B) disposed between an edge of the first surface and the side member.

According to various embodiments, the waterproofing member may be in close contact with an inner surface of the side member around the opening.

According to various embodiments of the disclosure, an electronic device may include: a housing including a first plate forming a rear surface of the electronic device, a side member extending from the first plate towards a front surface of the electronic device, and an opening formed to penetrate the side member; a speaker structure mounted adjacent to the opening in a recess at least partially defined by the first plate and the side member; and a fixing member configured to support a rear surface of the speaker structure so as to fix the speaker structure to an inner surface of the side member. The fixing member may include a first portion that comes into contact with a portion (e.g., the fourth surface F4 in FIGS. 11A and 11B) of a side surface of the speaker structure, a second portion extending from the first portion and bound to the side member, a third portion extending from the first portion to come into contact with the rear surface (e.g., the second surface F2 in FIGS. 11A and 11B) of the speaker structure, and a fourth portion extending from the third portion and at least partially supported on the inner surface of the first plate.

According to various embodiments, the electronic device may further include a support groove formed in an inner surface of the first plate. The fourth portion may be bent to be inclined or perpendicular with respect to the third portion so as to be at least partially accommodated in the support groove.

According to various embodiments, the electronic device may further include: a binding protrusion (e.g., the binding protrusion 419 in FIG. 5A or FIGS. 11A and 11B) formed on a top surface (e.g., the top surface U in FIG. 5A) of the side member, which is inclined or perpendicular with respect to an inner surface of the side member; and a binding hole (e.g., the binding hole 712*a* in FIG. 7) formed in the second portion. The second portion may at least partially come into contact with the top surface in a state in which the binding hole is engaged with the binding protrusion.

According to various embodiments, the speaker structure may further include a first waterproof protrusion (e.g., the first waterproof protrusion 611 in FIGS. 11A and 11B) protruding from an edge of a front surface (e.g., the first surface F1 in FIG. 11) facing away from the rear surface towards an outer surface of the side member.

According to various embodiments, the first waterproof protrusion forms a closed curve, and may be in close contact with the inner surface of the side member around the opening.

According to various embodiments, the speaker structure may further include a second waterproof protrusion (e.g., the waterproof protrusion 613 in FIGS. 11A and 11B) formed adjacent to the first waterproof protrusion on a side surface between the rear surface and the front surface, and the second waterproof protrusion may protrude from the side surface, and may form a closed curve.

According to various embodiments, the electronic device may further include: at least one first fastening boss (e.g., the first fastening boss 411 in FIG. 4) protruding from the inner surface of the first plate and extending parallel to the side member; a second fastening boss (e.g., the second fastening boss 615 in FIG. 6) disposed at one side of the speaker structure; a fastening piece (e.g., the fastening piece 715 in FIG. 7) extending from a first portion of the fixing member; and a fastening member (e.g., the fastening member 399 in FIG. 9) sequentially penetrating the fastening piece and the second fastening boss and fastened to the first fastening boss.

According to various embodiments, the side member may further include an assembly hole (e.g., the assembly hole 413 in FIG. 5A) formed in the inner surface thereof to accommodate at least a portion of the speaker structure, and the opening extends from the assembly hole towards the outer surface of the side member along a sound output direction of the speaker structure (e.g., the direction A in FIGS. 11A and 11B).

According to various embodiments, the speaker structure may further include a first waterproof protrusion protruding along a direction in which the opening extends from the edge of a front surface facing away from the rear surface, and a second waterproof protrusion protruding from a side surface between the rear surface and the front surface. The second waterproof protrusion may be disposed adjacent to the first waterproof protrusion.

According to various embodiments, the first waterproof protrusion and the second waterproof protrusion may form a closed curve, and may be in close contact with the inner surface of the side member around the opening.

According to various embodiments, the first waterproof protrusion may include an outer surface, which is at least partially curved, and the second waterproof protrusion may include an outer surface, which is at least partially flat.

According to various embodiments, the opening has a cross-sectional area that may gradually decrease from the assembly hole towards the outer surface of the side member.

According to various embodiments, the fixing member may further include a first support (e.g., the beads 1441 in FIG. 14 or the leaf springs 1541 in FIG. 15) protruding from the third portion to come into contact with the rear surface of the speaker structure.

According to various embodiments, the electronic device may further include a second support (e.g., the support 1611 in FIG. 6) interposed between the third portion of the fixing member and the rear surface of the speaker structure, and the second support may be pressed by the fixing member to be in close contact with the rear surface of the speaker structure.

In the foregoing detailed description, specific embodiments of the disclosure have been described. However, it will be evident to a person ordinarily skilled in the art that various modifications may be made without departing from the scope of the disclosure.

What is claimed is:

1. An electronic device comprising:

a housing comprising:

a first plate comprising an inner surface defining a portion of a space within the housing and an outer surface forming a portion of an exterior of the housing, and a side member integrally formed with an edge of the inner surface to be substantially perpendicular to the inner surface so as to form a recess with the inner surface, the side member comprising an opening;

a speaker structure disposed in the recess adjacent to the opening, the speaker structure comprising:

a first surface comprising a speaker diaphragm facing the opening, and a second surface facing away from the first surface;

a fastening member mounted substantially perpendicular to the inner surface so as to fix the speaker structure to the housing; and a fixing member fixed to the housing and disposed to be in contact with at least a portion of the second surface so as to press the second surface, wherein the side member further comprises an assembly hole formed in the inner surface thereof to accommodate at least a portion of the speaker structure, and wherein the opening extends from the assembly hole towards an outer surface of the side member along a sound output direction of the speaker structure.

2. The electronic device of claim 1, wherein the speaker structure further comprises a third surface facing the inner surface while being perpendicular to the first surface and the second surface and a fourth surface facing away from the third surface while being perpendicular to the first surface and the second surface, and the fixing member comprises a first portion that is in contact with at least a portion of the fourth surface, a second portion extending from at least a portion of the first portion and coupled to the side member, a third portion that comes into contact with at least a portion of the second surface, and a fourth portion extending from the third portion to come into contact with the inner surface while being perpendicular to the third portion.

3. The electronic device of claim 2, wherein the inner surface comprises a support groove that accommodates the fourth portion.

4. The electronic device of claim 1, wherein the speaker structure further comprises a waterproof member disposed between an edge of the first surface and the side member.

5. The electronic device of claim 4, wherein the waterproofing member is in close contact with an inner surface of the side member around the opening.

6. An electronic device comprising:

a housing comprising a first plate forming a rear surface of the electronic device, a side member extending from the first plate towards a front surface of the electronic device, and an opening formed to penetrate the side member;

a speaker structure mounted adjacent to the opening in a recess at least partially defined by the first plate and the side member; and a fixing member configured to support a rear surface of the speaker structure so as to fix the speaker structure to an inner surface of the side member, wherein the fixing member comprises:

a first portion that comes into contact with a portion of a side surface of the speaker structure, a second portion extending from the first portion and bound to the side member, a third portion extending from the first portion to come into contact with the rear surface of the speaker structure, and a fourth portion extending from the third portion and at least partially supported on an inner surface of the first plate, and wherein the fixing member further comprises a first support protruding from the third portion to come into contact with the rear surface of the speaker structure.

7. The electronic device of claim 6, further comprising:

a support groove formed in the inner surface of the first plate, wherein the fourth portion is bent to be inclined with respect to or to be perpendicular to the third portion so as to be at least partially accommodated in the support groove.

8. The electronic device of claim 6, further comprising:

a binding protrusion formed on a top surface of the side member, which is inclined with respect to or is perpendicular to the inner surface of the side member; and a binding hole formed in the second portion, wherein the second portion at least partially comes into contact with the top surface in a state in which the binding hole is engaged with the binding protrusion.

9. The electronic device of claim 6, wherein the speaker structure further comprises a first waterproof protrusion protruding from an edge of a front surface of the speaker structure facing away from the rear surface of the speaker structure towards an outer surface of the side member.

10. The electronic device of claim 9, wherein the speaker structure further comprises a second waterproof protrusion formed adjacent to the first waterproof protrusion on a side surface between the rear surface of the speaker structure and the front surface of the speaker structure, and the second waterproof protrusion protrudes from the side surface and forms a closed curve.

11. The electronic device of claim 10, wherein the side member further comprises an assembly hole formed in the inner surface thereof to accommodate at least a portion of the speaker structure, and the opening extends from the assembly hole towards the outer surface of the side member along a sound output direction of the speaker structure.

12. The electronic device of claim 10, wherein the first waterproof protrusion comprises an outer surface, which is at least partially curved, and the second waterproof protrusion comprises an outer surface, which is at least partially flat.

13. The electronic device of claim 6, further comprising:

at least one first fastening boss protruding from the inner surface of the first plate and extending parallel to the side member;

a second fastening boss disposed at one side of the speaker structure;

a fastening piece extending from a first portion of the fixing member; and a fastening member sequentially penetrating the fastening piece and the second fastening boss and fastened to the first fastening boss.

14. The electronic device of claim 11, wherein the opening has a cross-sectional area that gradually decreases from the assembly hole towards an outer surface of the side member.

15. The electronic device of claim 6, wherein the side member further comprises an assembly hole formed in the inner surface thereof to accommodate at least a portion of the speaker structure, and the opening extends from the assembly hole towards an outer surface of the side member along a sound output direction of the speaker structure.

* * * * *